US012626900B2

(12) United States Patent　　(10) Patent No.: US 12,626,900 B2
Goliaszewski et al.　　(45) Date of Patent: May 12, 2026

(54) ELASTIC AND STRETCHABLE GEL POLYMER ELECTROLYTE AND METHODS OF MAKING THE SAME

(71) Applicant: Hercules LLC, Wilmington, DE (US)

(72) Inventors: Alan Edward Goliaszewski, Hockessin, DE (US); Shufu Peng, Hockessin, DE (US); Donghai Wang, State College, PA (US); Jiangxuan Song, Xi'an (CN); Qingquan Huang, State College, PA (US); Kelly Anne Brush, Newark, DE (US)

(73) Assignee: Hercules LLC, Wilmington, DE (US)

( * ) Notice: Subject to any disclaimer, the term of this patent is extended or adjusted under 35 U.S.C. 154(b) by 86 days.

(21) Appl. No.: 18/344,679

(22) Filed: Jun. 29, 2023

(65) Prior Publication Data

US 2024/0006576 A1　　Jan. 4, 2024

Related U.S. Application Data

(63) Continuation of application No. 16/753,687, filed as application No. PCT/US2018/054105 on Oct. 3, 2018, now abandoned.

(Continued)

(51) Int. Cl.
| | |
|---|---|
| *H01M 4/583* | (2010.01) |
| *C08G 18/32* | (2006.01) |
| *C08G 18/76* | (2006.01) |
| *H01M 4/04* | (2006.01) |
| *H01M 4/133* | (2010.01) |
| *H01M 4/38* | (2006.01) |

(Continued)

(52) U.S. Cl.
CPC ...... *H01M 4/0404* (2013.01); *C08G 18/3203* (2013.01); *C08G 18/7664* (2013.01); *H01M 4/133* (2013.01); *H01M 4/386* (2013.01); *H01M 4/387* (2013.01); *H01M 4/466* (2013.01); *H01M 4/583* (2013.01); *H01M 4/587* (2013.01); *H01M 4/621* (2013.01); *H01M 4/662* (2013.01); *H01M 10/0525* (2013.01); *H01M 10/0565* (2013.01)

(58) Field of Classification Search
CPC ............ H01M 4/04; H01M 4/62; H01M 4/38; H01M 4/36; H01M 4/46
See application file for complete search history.

(56) References Cited

U.S. PATENT DOCUMENTS

| | | | |
|---|---|---|---|
| 5,075,408 A | 12/1991 | Suzuki et al. | |
| 5,741,609 A * | 4/1998 | Chen ................... | H01M 50/497 429/212 |

(Continued)

FOREIGN PATENT DOCUMENTS

| | | |
|---|---|---|
| CN | 106374088 A | 2/2017 |
| JP | 1996-113626 A2 | 5/1996 |
| WO | WO2015179197 A1 | 11/2015 |

*Primary Examiner* — Kenneth J Douyette
(74) *Attorney, Agent, or Firm* — Aseem Mehta; Nathalie Tietcheu

(57) ABSTRACT

The present disclosure relates generally to a coated electrode for use in preparation of lithium ion batteries and methods of preparing such. More particularly, the present disclosure relates to a polymer coating composition for coating electrodes of the lithium ion batteries (LIBs). The polymer coating composition comprises a polyurethane gel polymer electrolyte (GPE) formed by a reaction of an isocyanate and a polyol.

16 Claims, 6 Drawing Sheets

Related U.S. Application Data

(60) Provisional application No. 62/571,681, filed on Oct. 12, 2017, provisional application No. 62/568,224, filed on Oct. 4, 2017.

(51) Int. Cl.

| | | |
|---|---|---|
| *H01M 4/46* | (2006.01) | |
| *H01M 4/587* | (2010.01) | |
| *H01M 4/62* | (2006.01) | |
| *H01M 4/66* | (2006.01) | |
| *H01M 10/0525* | (2010.01) | |
| *H01M 10/0565* | (2010.01) | |

(56) References Cited

U.S. PATENT DOCUMENTS

| | | | | |
|---|---|---|---|---|
| 2003/0059682 | A1* | 3/2003 | Kerr | H01B 1/122 |
| | | | | 429/313 |
| 2006/0235144 | A1 | 10/2006 | Hwang et al. | |
| 2010/0081029 | A1 | 4/2010 | Fukuta et al. | |
| 2013/0273406 | A1* | 10/2013 | Ihara | H01M 10/0569 |
| | | | | 429/188 |
| 2016/0149216 | A1 | 5/2016 | Mizuno et al. | |
| 2016/0248086 | A1 | 8/2016 | Ohsawa et al. | |
| 2017/0110701 | A1* | 4/2017 | Shi | H01M 4/5825 |

* cited by examiner

ELASTIC AND STRETCHABLE GEL POLYMER ELECTROLYTE AND METHODS OF MAKING THE SAME

RELATED APPLICATIONS

This application claims priority to U.S. patent application Ser. No. 16/753,687, filed on Apr. 3, 2020, which is a National Stage Entry of PCT/US2018/054105, filed on Oct. 3, 2018, which claims priority to U.S. Provisional Application No. 62/568,224, filed on Oct. 4, 2017 and 62/571,681, filed on Oct. 12, 2017, all entitled Elastic and Stretchable Gel Polymer Electrolyte, which are incorporated herein in their entirety.

FIELD

The presently disclosed and/or claimed inventive process(es), procedure(s), method(s), product(s), result(s), and/or concept(s) (collectively referred to hereinafter as the "present disclosure") relates generally to a coated electrode for use in lithium ion batteries and methods of preparing such. More particularly, but not by way of limitation, the present disclosure relates to a polymer coating composition used for coating electrodes of lithium ion batteries (LIBs). The polymer coating composition comprises a polyurethane gel polymer electrolyte (GPE) formed by a reaction of an isocyanate and a polyol. Additionally, the present disclosure relates generally to the compositions and methods of making electrodes, in particular but without limitation, anodes, with the polymer coating composition comprising the polyurethane GPE.

BACKGROUND

Lithium ion batteries (LIBs) are used in many products including medical devices, electric cars, airplanes, and most notably, consumer products such as laptop computers, cell phones, and cameras. Due to their high energy densities, high operating voltages, and low-self discharges, lithium ion batteries have overtaken the secondary battery market and continue to find new uses in products and developing industries.

Generally, a lithium ion batteries (LIB) comprises an anode, a cathode, and an electrolyte material such as an organic solvent containing a lithium salt. More specifically, the anode and cathode (collectively, "electrodes") are formed by mixing either an anode active material or a cathode active material with a binder and a solvent to form a paste or slurry which is then coated and dried on a current collector (e.g., aluminum or copper), to form a film on the current collector. The anodes and cathodes are then layered or coiled prior to being housed in a pressurized casing containing an electrolyte material, which all together forms the LIB.

During charging and discharging of LIBs, significant volume changes in the electrodes may occur. Such cycling volume changes generate a large strain on the electrodes resulting in electrode structural damages and deformations, such as pulverization of the electrode active materials. Volume changes also increase accumulated growth of the solid electrolyte interface (SEI) layer, which is a passivation layer formed by chemical and electrochemical reaction of the liquid electrolyte. The formation of an SEI layer in an LIB is unavoidable, and, when stabilized, essential to accommodate the large volume change of electrodes.

However, when the electrodes experience large volume changes the SEI layer is destabilized and overgrowth can occur. The amount of electrode volume change depends largely upon the type of active material utilized in the electrode.

Silicon has recently come to the forefront as a promising anode active material for LIBs. See, for example, B. Lestriez et al., *On the Binding Mechanism of CMC in Si Negative Electrodes for Li-Ion Batteries*, Electrochemistry Communications, vol. 9, 2801-2806 (2007), which is hereby incorporated herein by reference in its entirety. Silicon is a promising anode active material because: (a) its high theoretical specific capacity of 4200 mAhg$^{-1}$ for Li4.4Si; (b) its high areal capacity with the ability to pair with commercial cathodes; (c) its low electrochemical potential between 0 and 0.4 V versus Li/Li$^+$; and (d) its small initial irreversible capacity compared with other metal- or alloy-based anode materials. See, B. Koo et al., *A Highly Cross-linked Polymeric Binder for High-Performance Silicon Negative Electrodes in Lithium Ion Batteries*, Angew. Chem. Int. Ed. 2012, 51, 8762-8767, hereby incorporated herein by reference in its entirety. It has been found that a specific capacity of about 600 mAhg$^{-1}$ can be achieved by mixing graphite with silicon oxide (SiOX) and conductive carbon at a weight ratio of about 0.795/0.163/0.042 and, alternatively, a specific capacity of about 450 mAhg$^{-1}$ can be achieved by mixing graphite with silicon oxide at a weight ratio of about 92 to 5, both of which increase the specific capacity of the anode material above the 340 mAhg$^{-1}$ associated with graphite independent of any other electrode active material. Silicon has been known, however, to undergo large degrees of expansion and contraction during charging and discharging (i.e., the volume changes discussed hereinabove), which can degrade a battery's capacity and overall performance.

In each battery cycle, as the electrode active material's silicon particles undergo expansion and contraction, particles can become pulverized and parts of the electrode can crack, exposing fresh active silicon particles on the electrode surface to the liquid electrolyte. Upon such exposure, a new SEI layer forms on the fresh active particle surface and will bind to lithium ions, causing irreversible loss of lithium ions and poor cycling life. Increased SEI layer formation is the primary reason for lithium ion loss in each battery cycle.

In order to improve battery life cycle, existing LIB technology teaches the use of additive compositions in electrode binders to restrict the physical expansion of the electrode. See, for example, U.S. Patent Application No. 2006/0235144 to Hwang et al. and U.S. Patent Application No. 2016/0149216 to Mizuno et al.

Electrodes comprising these binder additives alone do not have the mechanical properties necessary, however, to support the large volume changes that occur with some electrode active materials. For example, a self-healing polymer has been used as a binder additive to improve the cycling stability of the anode. See, Wang, Chao, et al. "Self-Healing Energy Lithium-Ion Batteries." *Nature Chemistry*, Vol. 1802, 17 Nov. 2013, pp. 1-7.' Doi:10.10238. However, the rate performance of such functional polymer additives is not significantly improved, and the relative amount of coating polymer used is excessive.

The presently disclosed and/or claimed coating compositions comprising a polyurethane gel polymer electrolyte (GPE), however, improve electrode adhesion strength and decrease electrode thickness change during the charge/discharge process of LIBs for long-term cycling stability. Specifically, the GPE coating is elastic and stretchable to accommodate the volume change of the electrode upon cycling. The GPE coating also maintains the electrode integrity for long-term cycling: when the electrode active material particles get pulverized during cycling, the GPE coating can restrict the pulverized particles and conductive carbon into a small localized space, thereby maintaining the electronic contact between cracked particles and conductive carbon. The GPE coating improves the cycling stability of LIBs.

SUMMARY

The present disclosure encompasses an electrode coated with a polymer coating composition for use in lithium ion batteries and methods of preparing such, the polymer coating composition comprising a polyurethane gel polymer electrolyte. In one non-limiting embodiment, the polyurethane gel polymer electrolyte comprises a polyurethane formed by reacting an isocyanate and a polyol to form a polyurethane solution, which is coated on the electrode.

The present disclosure further encompasses a coated electrode for use in a lithium ion battery comprising an electrode comprising: (1) a film comprising: (i) an electrode active material, (ii) a binder composition, and (iii) a conductive agent, and (2) a current collector; and a polymer coating composition comprising a polyurethane gel polymer electrolyte. The polymer coating composition can substantially cover an outer surface of the electrode and can be penetrated the electrode. In one non-limiting embodiment, the polyurethane gel polymer electrolyte comprises a polyurethane formed by a reaction of an aromatic diisocyanate and a polyether polyol.

Additionally, the present disclosure also encompasses a method of making a coated electrode for use in preparation of a lithium ion battery comprising steps of: (1) combining an electrode active material, a binder composition, and a conductive agent to form a slurry; (2) applying the slurry to a current collector to form a coated current collector comprising a slurry layer on the current collector; (3) drying the slurry layer on the coated current collector to form a film on the current collector, wherein the electrode comprises the film and the current collector; (4) applying a polymer coating composition in solvent to the electrode to form a coated electrode having an outer surface substantially covered by the polymer coating composition; and (5) evaporating the solvent from the polymer coating composition to form a polyurethane gel polymer electrolyte coating on the electrode. In one non-limiting embodiment, the polyurethane gel polymer electrolyte comprises a polyurethane formed by a reaction of an aromatic diisocyanate and a polyether polyol. In another non-limiting embodiment, the method includes calendaring the electrode of the step (3) prior to the step (4).

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings.

DETAILED DESCRIPTION

Figure 1:
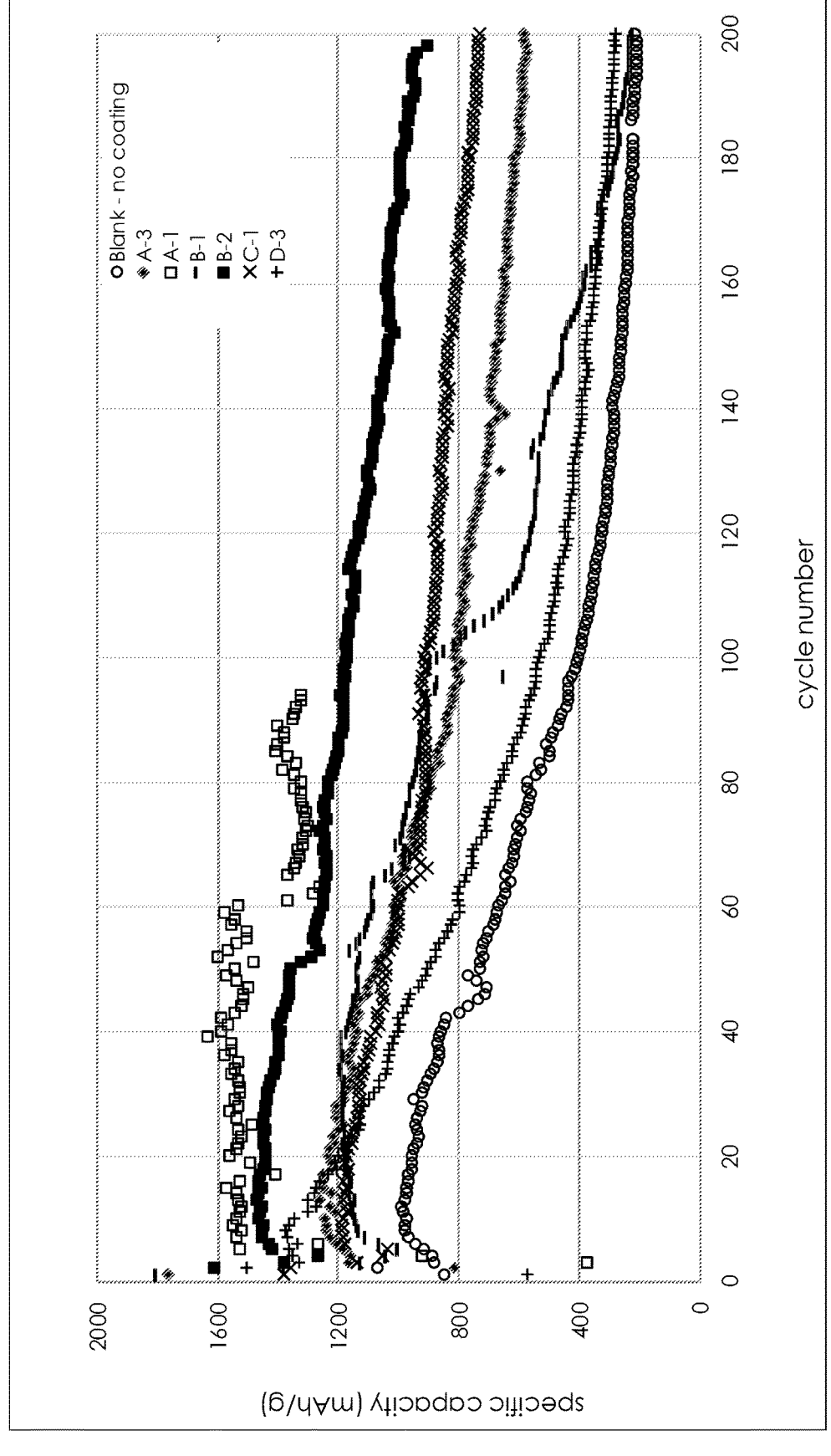
FIG. 1 is a graphical representation of the capacity retention after 200 cycles for the anodes with coatings from the Samples A-1, A-3, B-1, B-2, C-1 and D-3 and without coating, as described below.

Before explaining at least one embodiment of the present disclosure in detail, it is to be understood that the present disclosure is not limited in its application to the details of construction and the arrangement of the components or steps or methodologies set forth in the following description or illustrated in the drawings. The present disclosure is capable of other embodiments or of being practiced or carried out in various ways. Also, it is to be understood that the phraseology and terminology employed herein is for the purpose of description and should not be regarded as limiting.

Unless otherwise defined herein, technical terms used in connection with the present disclosure shall have the meanings that are commonly understood by those of ordinary skill in the art. Further, unless otherwise required by context, singular terms shall include pluralities and plural terms shall include the singular. As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

All patents, published patent applications, and non-patent publications mentioned in the specification are indicative of the level of skill of those skilled in the art to which the present disclosure pertains. All patents, published patent applications, and non-patent publications referenced in any portion of this application are herein expressly incorporated by reference in their entirety to the same extent as if each individual patent or publication was specifically and individually indicated to be incorporated by reference.

All of the articles and/or methods disclosed herein can be made and executed without undue experimentation in light of the present disclosure. While the articles and methods of the present disclosure have been described in terms of preferred embodiments, it will be apparent to those of ordinary skill in the art that variations may be applied to the articles and/or methods and in the steps or in the sequence of steps of the method described herein without departing from the concept, spirit and scope of the present disclosure. All such similar substitutes and modifications apparent to those skilled in the art are deemed to be within the spirit, scope and concept of the disclosure.

As utilized in accordance with the present disclosure, the following terms, unless otherwise indicated, shall be understood to have the following meanings.

The use of the word "a" or "an" when used in conjunction with the term "comprising" may mean "one," but it is also consistent with the meaning of "one or more," "at least one," and "one or more than one." The use of the term "or" is used to mean "and/or" unless explicitly indicated to refer to alternatives only if the alternatives are mutually exclusive, although the disclosure supports a definition that refers to only alternatives and "and/or." Throughout this application, the term "about" is used to indicate that a value includes the inherent variation of error for the quantifying device, the method being employed to determine the value, or the variation that exists among the study subjects. For example, but not by way of limitation, when the term "about" is utilized, the designated value may vary by plus or minus twelve percent, or eleven percent, or ten percent, or nine percent, or eight percent, or seven percent, or six percent, or five percent, or four percent, or three percent, or two percent, or one percent. The use of the term "at least one" will be understood to include one as well as any quantity more than one, including but not limited to, 1, 2, 3, 4, 5, 10, 15, 20, 30, 40, 50, 100, etc. The term "at least one" may extend up to 100 or 1000 or more depending on the term to which it is attached. In addition, the quantities of 100/1000 are not to be considered limiting as lower or higher limits may also produce satisfactory results. In addition, the use of the term "at least one of X, Y, and Z" will be understood to include X alone, Y alone, and Z alone, as well as any combination of X, Y, and Z. The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition.

comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. The term "or combinations thereof" as used herein refers to all permutations and combinations of the listed items preceding the term. For example, "A, B, C, or combinations thereof" is intended to include at least one of: A, B, C, AB, AC, BC, or ABC and, if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

As used herein, the term "substantially" means that the subsequently described event or circumstance completely occurs or that the subsequently described event or circumstance occurs to a great extent or degree. For example, the term "substantially covers" means that a polymer coating composition covers at least about 70%, or at least about 75%, or at least about 80%, or at least about 85%, or at least about 90%, or at least 95% of the surface area of an outer surface of an electrode. The term "substantially free" as used herein means less than 5 wt %, or 3 wt %, or 2 wt %, or 1 wt %, or 0.5 wt %, or 0.1 wt %.

A coated electrode of the present disclosure generally comprises, consists of, or consists essentially of an electrode comprising (1) a film comprising: (i) an electrode active material, (ii) a binder composition, and (iii) a conductive agent, and (2) a current collector; and a polymer coating composition comprising a polyurethane gel polymer electrolyte, wherein the polymer coating composition substantially covers an outer surface of the electrode. The polyurethane gel polymer electrolyte comprises a polyurethane formed by a reaction of an isocyanate and a polyol. In one non-limiting embodiment, the reaction is substantially free of polyamine chain extenders. The polymer coating composition can generally be used in the manufacture of a coated electrode for use in the production of a lithium ion battery (LIB).

In one non-limiting embodiment, the isocyanate is a diisocyanate having at least two isocyanate groups. The diisocyanate may include aromatic diisocyanates, aliphatic diisocyanates, or combinations thereof. In some embodiments, the diisocyanate includes one or more aromatic diisocyanates. More specifically, the diisocyanate may be selected from the group consisting of aromatic diisocyanates such as 4,4'-methylenebis(phenyl isocyanate) (MDI), m-xylene diisocyanate (XDI), phenylene-1,4-diisocyanate, naphthalene-1,5-diisocyanate, and toluene diisocyanate (TDI); and aliphatic diisocyanates such as isophorone diisocyanate (IPDI), 1,4-cyclohexyl diisocyanate (CHDI), decane-1,10-diisocyanate, lysine diisocyanate (LDI), 1,4-butane diisocyanate (BDI), 3,3'-dimethyl-4,4'-biphenylene diisocyanate (TODI), 1,5-naphthalene diisocyanate (NDI), and dicyclohexylmethane-4,4'-diisocyanate (H12MDI). Mixtures of two or more diisocyanates may be used. In particular, but without limitation, the diisocyanate may be MDI.

The polyol may be a polyether polyol. Suitable polyether polyols include poly(ethylene glycol) derived from ethylene oxide reacted with ethylene glycol, poly(propylene glycol) derived from propylene oxide reacted with propylene glycol, poly(tetramethylene ether glycol) derived from water reacted with tetrahydrofuran which can also be described as polymerized tetrahydrofuran, and which is commonly referred to as poly(tetrahydrofuran) (PTHF). Copolyethers can also be utilized in the described compositions. More specifically, the polyether polyol can be selected from the group consisting of polyethylene glycol, polypropylene glycol, copolymers of ethylene glycol and propylene glycol such as poly(oxypropylene)-poly(oxyethylene glycol), and PTHF. In particular, but without limitation, the polyol may be PTHF. The polyol may have a number average molecular weight (Mn) in a range of from about 1,000 to about 3,500 Daltons, or from about 1,000 to about 2,500 Daltons, or from about 1,000 to about 1,600 Daltons.

The polyurethane gel polymer electrolyte may comprise a polyurethane formed by a reaction of an isocyanate with a polyol. The molar ratio of the polyol to the isocyanate for the reaction may be in a range of from about 1.0:1.2 to about 1.0:2.0, or from about 1.0:1.5 to about 1.0:1.8. In one non-limiting embodiment, the isocyanate is MDI, and the polyol is PTHF. The molar ratio of PTHF to MDI is about 1.0:1.5.

In one non-limiting embodiment, a quenching agent can be added to the reaction comprising an aromatic diisocyanate and a polyether polyol. The quenching agent may be a C1-C4 alcohol. In particular, the quenching agent may be selected from the group consisting of methanol, ethanol, isopropanol, and butanol.

The polyurethane gel polymer electrolyte can be solution-coated on the electrode. By solution-coated, it is meant that a solution comprising the polyurethane and a solvent is applied to the electrode and then the solvent is evaporated, which leaves the polyurethane gel polymer electrolyte coated on the electrode. In one non-limiting embodiment, the polyurethane is present in the solution in a range of from about 1% to about 25% by weight, or from about 1% to about 15% by weight, or from about 5% to about 15% by weight, or from about 5% to about 10% by weight, or from about 10% to about 15% by weight. The solvent can be selected from the group consisting of N,N-dimethylacetamide (DMAc), N-methyl-2-pyrrolidone (NMP), tetrahydrofuran (THF), dimethyl sulfoxide (DMSO), tetramethylsilane (TMS), and dimethylformamide (DMF).

By solution-coating the polyurethane gel polymer electrolyte onto the electrode, the gel polymer electrolyte maintains a sufficient low viscosity, thereby allowing the coating to penetrate the electrode void space and uniformly distribute on and within the electrode, thereby coating the electrode's surface. The solution-coated gel polymer electrolyte forms a stretchy and transparent membrane on the surface of the electrode and within the electrode void space. Additionally, the solution-coated gel polymer electrolyte contains micropores for enhanced ion storage and mobility. Solution-coating does not include application by temperature, such as, melt coating, bar coating, heat lamination, hot melt extrusion, and co-extrusion. Solution-coating allows for improved ion permeability over temperature application methods.

The coated electrode includes an electrode comprising, consisting of, or consisting essentially of 1) a film comprising (i) an electrode active material, (ii) a binder composition, and (iii) a conductive agent; and (2) a current collector. In one embodiment, the electrode active material is present in the film in a range of from about 65 to about 89 wt %, or from about 70 to about 90.5 wt %, or from about 75 to about 93 wt %; the conductive carbon is present in a range of from about 1 to about 10 wt %, or from about 1 to about 8 wt %, or form about 1 to about 5 wt %; and the binder composition is present in the film in a range of from about 1 to about 34 wt %, or from about 1.5 to about 29 wt %, or from about 2 to about 24 wt %.

The coated electrode has a thickness in a range of from about 15 to about 70 μm, or from about 15 about 50 μm, or from about 15 μm to about 30 μm. The current collector can comprise any material that acts as an electrical conductor for either the anode or cathode active materials. The current collector can be selected from the group consisting of aluminum, carbon, copper, stainless steel, nickel, zinc, silver, and combinations thereof. In one non-limiting embodiment, the current collector for the anode comprises copper foil. In another non-limiting embodiment, the current collector for the cathode comprises aluminum foil.

The binder composition of the present disclosure generally comprises an ionizable water soluble polymer. The binder composition may further include a redispersible powder which can comprise, consist of, or consist essentially of a protective colloid (also referred to as a "redispersing aid"), an anticaking agent, and a latex polymer. The ionizable water soluble polymer can be any material selected from the group consisting of a hydrophilically modified cellulose material, polyacrylic acid, a polyacrylic acid copolymer, polyacrylamide, an acrylamide copolymer, alginate, xanthan gum, polyvinyl alcohol, anionically modified polysaccharide, lithiated alginate, lithiated xanthan gum, lithiated polyacrylic acid, lithiated polyvinyl alcohol, a lithiated anionically modified polysaccharide, and combinations thereof.

The anionically modified polysaccharide can be selected from the group consisting of carboxyalkyl cellulose, carboxyalkyl hydroxyalkyl cellulose, carboxyalkyl guaran, carboxyalkyl hydroxyalkyl guaran, and combinations thereof. The lithiated anionically modified polysaccharide can be selected from the group consisting of lithiated carboxyalkyl cellulose, lithiated carboxyalkyl hydroxyalkyl cellulose, lithiated carboxyalkyl guaran, lithiated carboxyalkyl hydroxyalkyl guaran, and combinations thereof. For example, but without limitation, the Soteras MSi binder available from Ashland, Inc. (Wilmington, DE) can be used in the present disclosure. In one non-limiting embodiment, the binder composition is substantially free of polyurethane polymer. In another non-limiting embodiment, the binder composition is substantially free of latex.

The electrode active material can be an anode active material. The anode active material can be any material comprising, consisting of, or consisting essentially of (1) at least one of an artificial graphite, a natural graphite, surface modified graphite, coke, hard carbon, soft carbon, carbon fiber, conductive carbon, and combinations thereof, (2) silicon-based alloys, (3) complex compounds comprising, consisting of, or consisting essentially of: i) at least one of artificial graphite, natural graphite, surface modified graphite, coke, hard carbon, soft carbon, carbon fiber, conductive carbon and combinations thereof, and ii) a metal selected from the group consisting of Al, Ag, Bi, In, Ge, Mg, Pb, Si, Sn, Ti, and combinations thereof, (4) a lithium complex metal oxide, (5) lithium-containing nitrides, (6) silicon-graphene, (7) a silicon-carbon nanotube, (8) silicon oxide, and (9) combinations thereof.

The anode active material, in one non-limiting embodiment, can be selected from the group consisting of artificial graphite, natural graphite, surface modified graphite, coke, hard carbon, soft carbon, carbon fiber, conductive carbon, and combinations thereof. In another non-limiting embodiment, the anode active material comprises a complex compound comprising, consisting of, or consisting essentially of (i) at least one of artificial graphite, natural graphite, surface modified graphite, coke, hard carbon, soft carbon, carbon fiber, conductive carbon, and combinations thereof, and (ii) silicon and/or silicon oxide. The anode active material, in yet another non-limiting embodiment, can comprise, consist of, or consist essentially of lithium titanate oxide (LTO).

In one non-limiting embodiment, the anode active material can be silicon oxide. In another non-limiting embodiment, the anode active material can be a mixture of graphite and silicon oxide, wherein the silicon oxide can, for example but without limitation, be represented by the formula SiOX, wherein X can be either one or less than 2 and further wherein the weight ratio of the graphite to the silicon oxide may be at least 50:50, or in a range of from about 99:1 to about 1:99, or from about 80:20 to about 95:5, or from about 90:10 to about 95:5. In one non-limiting embodiment, the above-described anode active material comprising graphite and silicon oxide can also comprise conductive carbon in a range from about 0.1 to about 10 wt %, or from about 1 to about 8 wt %, or from about 2 to about 5 wt %.

In another non-limiting embodiment, the anode active material may comprise a silicon-graphene composition and/or a combination of a silicon-graphene composition and graphene. See, for example but without limitation, the XG-SIG™ silicon-graphene nano-composite material available from XG Sciences, Inc. (Lansing, MI). In yet another non-limiting embodiment, the electrode active material may comprise a silicon alloy, for example but without limitation, STN, and/or a mixture of a silicon alloy and graphite. More specifically, the electrode active material may comprise silicon alloy and graphite mixture, wherein the silicon alloy is present in a range of from about 30 to 50 wt %, or from about 35 to about 45 wt %, or from about 37.5 to about 42.5 wt %, and wherein the graphite is present in a range from about 50 to about 70 wt %, or from about 55 to about 65 wt % or from about 57.5 to about 62.5 wt %.

In one non-limiting embodiment, the above-described anode active material may comprise a combination of a silicon-graphene composition and graphite, further comprising conductive carbon. More specifically, the anode active material may comprise silicon-graphene and graphite and/or conductive carbon, wherein the silicon-graphene is present in a range of from about 20 to 95 wt %, or from about 70 to 95 wt %, or from about 75 to 95 wt %, or from about 80 to about 95 wt %, and wherein the graphite is present in a range of from about 5 to about 30 wt %, or from about 10 to about 25 wt %, or from about 10 to about 20 wt %, and wherein the conductive carbon is present in a range of from about 1 to about 10 wt %, or from about 1 to about 8 wt %, or form about 1 to about 5 wt %.

The electrode active material can be a cathode active material. The cathode active material can be any material comprising, consisting of, or consisting essentially of lithium-containing transition metal oxides. The cathode active material, in one non-limiting embodiment, can be selected from the group consisting of lithium iron phosphate (LiFePO4), lithium cobalt oxide (LiCoO2), lithium nickel oxide (LiNiO2), lithium nickel cobalt aluminum oxide (LiNiCoAlO2), lithium nickel manganese cobalt oxide (LiNiMnCoO2), lithium manganese oxide (LiMn2O4), and combinations thereof.

The conductive agent can be conductive carbon, carbon nanotubes, carbon black, carbon fiber, graphite, graphene, and combinations thereof.

The current collector can be any material that acts as an electrical conductor for either the anode active material or the cathode active material. For example, but without limitation, the current collector can be selected from the group of materials comprising, consisting of, or consisting essentially of aluminum, carbon, copper, stainless steel, nickel, zinc, silver, and combinations thereof. In one non-limiting embodiment, the current collector for the anode is a copper foil. In another non-limiting embodiment, the current collector for the cathode is an aluminum foil.

It has been unexpectedly discovered that the coated electrode of the present disclosure greatly improves battery cycle life. More specifically, the polyurethane gel polymer electrolyte coating increases electrode adhesion strength and decreases electrode thickness change during the charge/discharge cycling process of LIBs thereby increasing cycling stability for long-term use. The GPE coating also maintains the electrode integrity for long-term cycling: without being bound by theory, when the electrode active material particles are pulverized during cycling, the GPE coating restricts the pulverized particles and conductive carbon into a small localized space, thus maintaining the electronic contact between cracked particles and conductive carbon. As shown in the Examples, an electrode coated with the polyurethane gel polymer electrolyte of the present disclosure greatly improves battery cycling life as compared to known electrodes which include a polyurethane gel polymer within the electrolyte binder.

The present disclosure additionally encompasses a method of making a coated electrode for a lithium ion battery comprising steps of: (1) combining an electrode active material, a binder composition, and a conductive agent to form a slurry; (2) applying the slurry to a current collector to form a coated current collector comprising a slurry layer on the current collector; (3) drying the slurry layer on the coated current collector to form a film on the current collector, wherein the electrode comprises the film and the current collector; (4) applying a polymer coating composition in solvent to the electrode to form a coated electrode having an outer surface substantially covered by the polymer coating composition; and (5) evaporating the solvent from the polyurethane coating composition to form a polyurethane gel polymer electrolyte coating on the electrode. In one embodiment, the method includes calendaring the electrode of the step (3) prior to the step (4).

In one non-limiting embodiment, the electrode active material is present in the film in a range of from about 65 to about 89 wt %, or from about 70 to about 90.5 wt %, or from about 75 to about 93 wt %; the conductive carbon is present in a range of from about 1 to about 10 wt %, or from about 1 to about 8 wt %, or form about 1 to about 5 wt %; and the binder composition is present in the film in a range of from about 1 to about 34 wt %, or from about 1.5 to about 29 wt %, or from about 2 to about 24 wt %. In one embodiment, a mass ratio of the electrode active material to the conductive agent to the binder composition is about 8:1:1.

The polyurethane coating composition has a polyurethane mass loading in a range of from about 0.1 mg/cm$^2$ to about 0.9, or from 0.2 mg/cm$^2$ to about 0.7 mg/cm$^2$, or from 0.2 mg/cm$^2$ to about 0.5 mg/cm$^2$. In one embodiment, the mass loading is about 0.3 mg/cm$^2$.

In one non-limiting embodiment, the polyurethane gel polymer electrolyte is solution-coated on the electrode. By solution-coated, it is meant that a solution comprising polyurethane and solvent is applied to the electrode to form a coated electrode, and then the solvent is evaporated, which leaves the polyurethane gel polymer electrolyte coated on the electrode. A dilute solution of polyurethane in solvent can be applied to the electrode. In one non-limiting embodiment, the polyurethane is present in the solution in a range of from about 1% to about 25%, or from about 5% to about 15%, or from about 5% to about 10%, or from about 10% to about 15% by weight. The solvent can be selected from the group consisting of N,N-dimethylacetamide (DMAc), N-methyl-2-pyrrolidone (NMP), tetrahydrofuran (THF), dimethyl sulfoxide (DMSO), tetramethylsilane (TMS) and dimethylformamide (DMF).

In an additional embodiment the above-described electrodes have an impedance less than about 300 ohms, or less than about 250 ohms, or less than about 200 ohms, wherein the film thickness is in a range of from about 15 to about 70 μm, or from about 15 to about 50 μm, or from about 15 to 30 μm.

EXAMPLES

Polyurethane Preparation and Characterization 42.92 g poly(tetrahydrofuran) ("PTHF") was dried at 80° C. under vacuum of 29 in. Hg for 4-6 hours. The PTHF was cooled to 20-24° C. in a dessicator. Stock solution of N, N, N', N", N"-Pentamethyldiethylenetriamine (PMDTA) in N, N-Dimethylacetamide (DMAc) was prepared by: (1) adding 0.44 g PMDTA to 8.36 g DMAc in a dried glass vial, (2) gently shaking the solution, and (3) storing the solution under nitrogen.

To a dry glass resin kettle equipped with a reflux condenser, a mechanical agitator, a thermocouple, and a nitrogen inlet was added dry PTHF under a steady stream of nitrogen. The reactor was heated to 80° C. 172.96 g DMAc, 4.78 g MDI for Polymers A-C and 5.72 g MDI for Polymer D, and 0.88 g PMDTA/DMAc stock solution were added into the reactor. The contents of the reactor were heated at 80° C. and mixed under a steady stream of nitrogen for a certain time listed as TIME1 in Table 1. The contents of the reactor were cooled to a temperature around 55-60° C. to obtain solutions of Polymers A-D. Different samples were prepared from the polymer solutions. Approximately 50% of the contents of the reactor were removed to provide unquenched polymer solutions. To the remaining solution in the reactor was added MeOH (10 g) and dibutyltin dilaurate (DBTD) (1-2 drops). The resultant polymer solution was mixed at a temperature between 55-60° C. for a certain time as TIME2 listed in Table 1.

A film was prepared from the above polymer solution as follows. The polymer solution was poured onto a glass petri dish and heated at 120° C. under vacuum of 29 in. Hg for 4-6 hours to remove DMAc. Once cooled to 20-24° C., the film was removed from the petri dish.

Size Exclusion Chromatography (SEC) was used for measuring polyurethane molecular weight distributions. A Waters HPLC System and Empower™ Chromatography Data System, commercially available from the Waters Corporation (Milford, MA) were used to measure the molecular weights. As used herein with respect to polymers, the terms molecular weight and molecular weight averages are defined in ASTM D3016-97 as measured by SEC. The relative molecular weight averages from the SEC were calculated versus polystyrene standards with narrow molecular weight distribution. Table 1 lists the reaction time and samples prepared from each Polymer A-D as well as SEC molecular weights for each sample.

Anode Preparation

An anode was prepared for coating and testing. 12.2 g SiOx, commercially available from Osaka Titanium Technologies Co., Ltd. (Amagasaki, Hyogo Prefecture, Japan) was used as an anode active material. 1.53 g conductive carbon, C-NERGY™ Super C65, commercially available from Timcal Graphite & Carbon (Bodio, Switzerland) was used as a conductive agent. 1.52 g Soteras™ MSi, commercially available from Ashland LLC. (Wilmington, DE, USA) was used as a binder composition.

A slurry was prepared by (1) dissolving the Soteras™ MSi in water to form a 2 wt % aqueous binder solution; (2) adding the conductive carbon powder to the aqueous binder solution; (2) adding water and mixing the compositions with a Thinky® mixer (available from Thinky Corporation, Tokyo, Japan) to disperse the conductive carbon powder in the solution. The total water added was 89.94 g. The mass ratio of the anode active material to the conductive carbon to the binder composition in the slurry was about 8:1:1.

The anode was prepared by: (1) coating the slurry on a copper foil current collector to form the anode, (2) heating the anode at 60° C. in a conventional oven for 30 minutes, (3) increasing the temperature to 80° C. and heating for 30 minutes, (4) increasing the temperature to 100° C. and heating for 30 minutes, (5) increasing the temperature to 120° C. and heating for 120 minutes, and (6) thereafter cooling the anode.

The coated anode was prepared by coating the polyurethane solution in DMAc on the anode prepared as above. For the polyurethane film listed in Table 1, the film was dissolved in DMAc to form a polyurethane solution. The polyurethane concentration was adjusted to about 6-8 wt % in the polyurethane solution for coating the anode. The polyurethane solution was then coated on the anode at ambient conditions.

Electrochemical Test

Preparation of Half Coin Cells

Half coin cells having a 20 mm diameter and a 3.2 mm height (CR-2032 half coin cells) were made using the anodes prepared above in combination with lithium metal disc cathodes, a polyolefin separator, and an electrolyte of 1 mol/L LiPF6 in a mixture of ethylene carbonate, diethyl

TABLE 1

| Polymer | TIME1 min | Sample | Sample Description | TIME2 min | SEC Mn | Mw | Mz |
|---|---|---|---|---|---|---|---|
| A | 60 | A-1 | Film prepared from unquenched polymer solution | | 25,600 | 67,900 | 112,000 |
| | | A-2 | Film from quenched polymer solution with MeOH/DBTD | 30 | 26,000 | 69,800 | 118,000 |
| | | A-3 | Unquenched polymer solution | | 30,500 | 94,600 | 161,000 |
| | | A-4 | Quenched polymer solution with MeOH/DBTD | | 19,900 | 61,600 | 99,900 |
| B | 120 | B-1 | Film prepared from unquenched polymer solution | | 37,000 | 105,000 | 176,000 |
| | | B-2 | Film prepared from quenched polymer solution with MeOH/DBTD | 40 | 34,500 | 104,000 | 181,000 |
| C | 180 | C-1 | Film prepared from unquenched polymer solution | | 39,100 | 133,000 | 239,000 |
| | | C-2 | Film prepared from quenched polymer solution with MeOH/DBTD | 58 | 50,200 | 171,000 | 318,000 |
| D | 60 | D-1 | Film prepared from unquenched polymer solution | | 33,200 | 202,000 | 587,000 |
| | | D-2 | Film prepared from quenched polymer solution with MeOH/DBTD | 55 | 25,300 | 139,000 | 419,000 |
| | | D-3 | Unquenched polymer solution | | 57,800 | 397,000 | 1,190,000 | carbonate, and dimethyl carbonate (EC:DEC:DMC, 1:1:1 by weight) with 10 w % fluoroethylene carbonate (FEC). Lithium hexafluorophosphate (LiPF6) was used as the lithium salt. The half coin cells were subjected to cyclic and rate capability tests as various rates, as well as a test to determine impedance of the half coin cells.

Discharge Capacity Test

In a formation cycle, the cell was cycled between 0.01 V and 1.5 V using a current rate of 0.05 C, which helped to form stable SEI. The discharge capacities for the half coin cells prepared above were evaluated at 20-24° C., using a current rate of 0.3 C wherein the coated anodes had a film thickness of from about 15 μm to about 70 μm. The anodes were evaluated in the voltage range from 0.01 V to 1.5 V versus Li/Li$^+$, with a 10 minutes rest time between charging and discharging. A constant voltage (CV) mode and a constant current (CC) mode were used in the case of the charging state, i.e. Li insertion into the SiOx, and the discharge state, i.e., Li extraction from SiOx, respectively. The results are shown in FIG. 1 which was obtained from the 200 cycles. It can be seen that polyurethane GPE coating have higher specific capacity and better retention than anodes prepared without a polyurethane GPE coating.

Rate Capability Test—Lifecycle Characteristics

Figure 2:
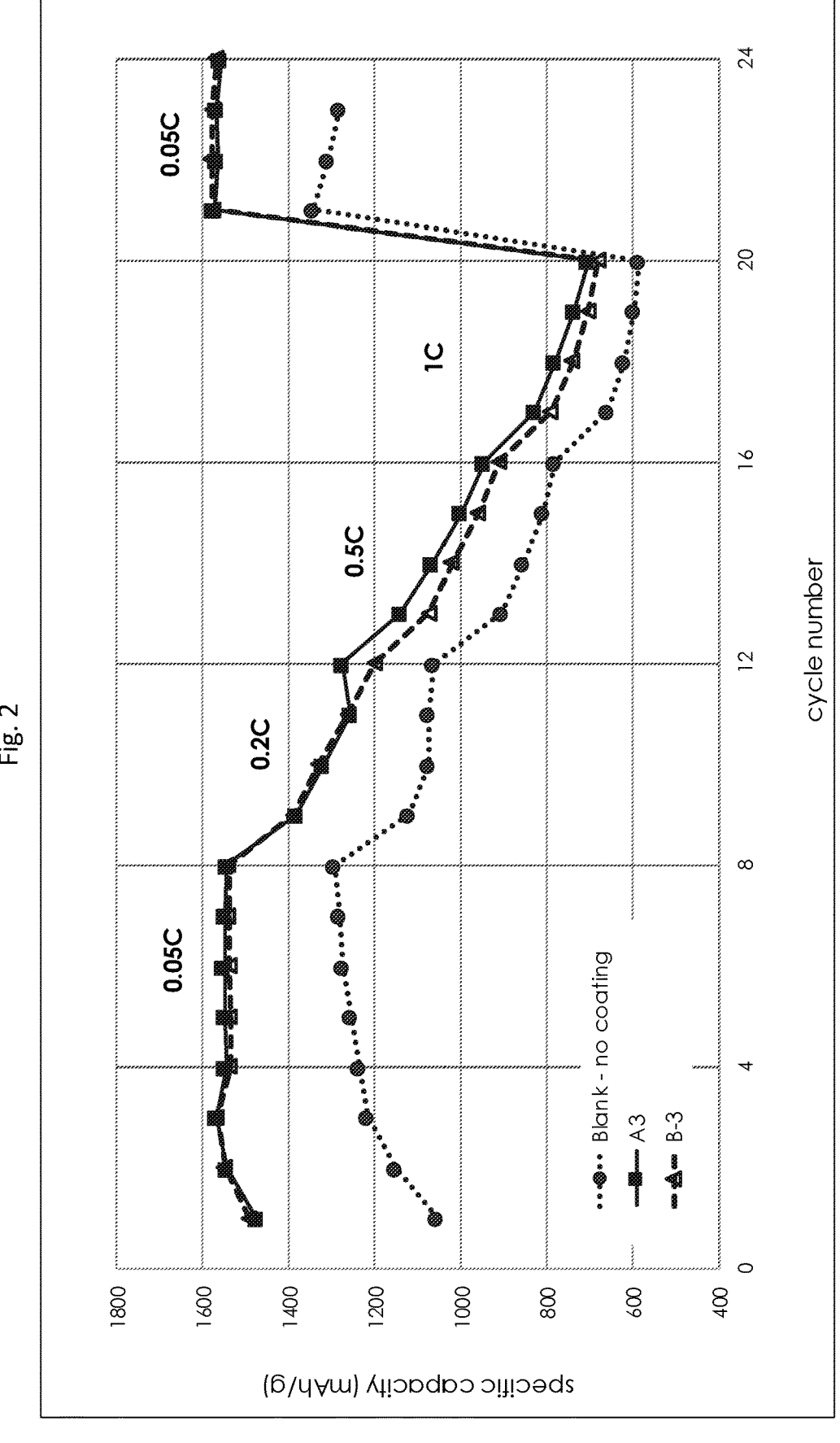
FIG. 2 is a graphical representation of the rate capabilities of the anodes with coatings from Samples A-3 and B-3 and without coating as measured by their capacity retentions at rates of 0.05 C, 0.2 C, 0.5 C, 1 C, and 0.05 C for 4 cycles per rate, as described below.

The rate capabilities of the half coin cells prepared from Samples A-3 and B-3 were evaluated at 20-24° C., in a voltage window of 0.01 V to 1.5 V, for a range by charging and discharging the cells using CC/CC mode at a rate of 0.05 C, 0.2 C, 0.5 C, 1 C and 0.05 C for 4 cycles per rate, wherein the coated anodes had a thickness of from 15 μm and 70 μm. The areal loading for the anode was 1.8 mg SiOx/cm$^2$. The results are shown in FIG. 2 and indicate that anodes prepared with a polyurethane GPE coating have higher specific capacity than anodes prepared without a polyurethane GPE coating.

Impedance

Figure 3:
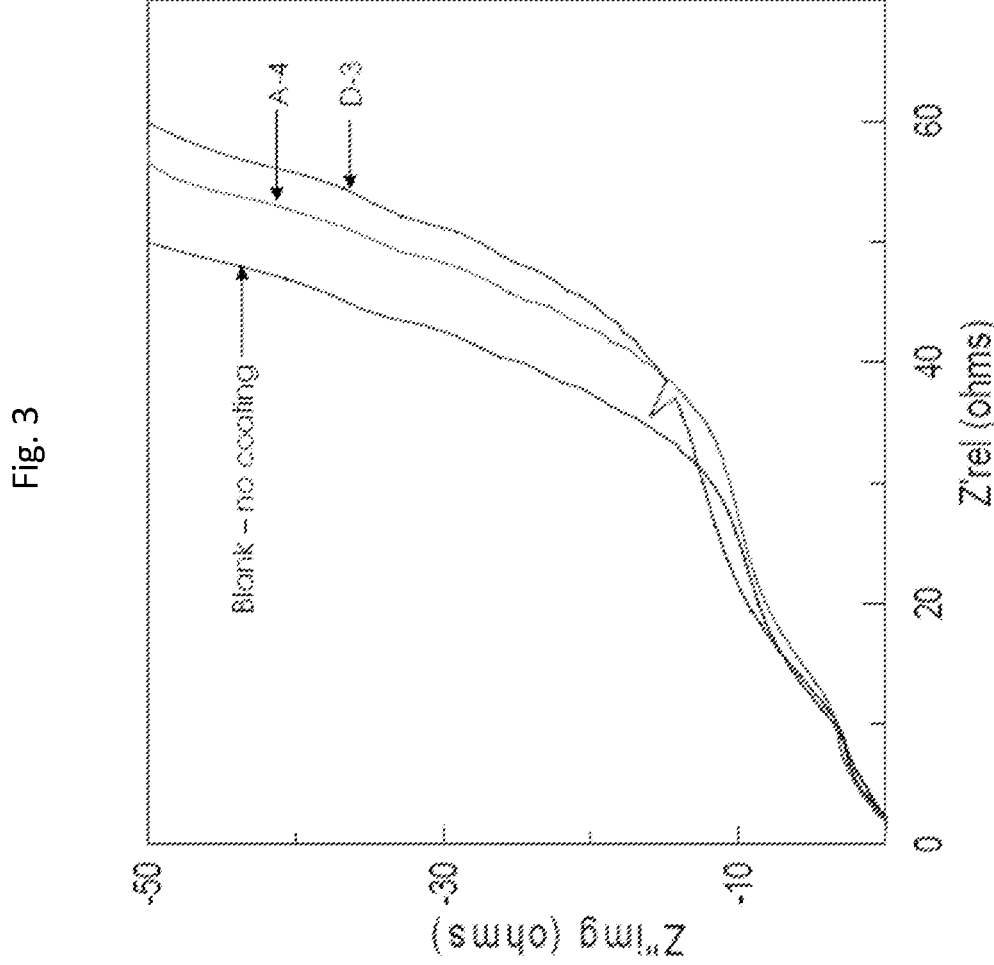
FIG. 3 is a graphical representation of the impedance of the anodes with coatings from Samples A-4 and D-3 and without coating, as described below.

Impedance of the above-described 2032 half coin cells prepared from Samples A-4 and D-3 were tested for impedance. The battery impedance data was measured using a Solartron® 1260 from Solartron Analytical (Leicester, UK). The results are shown in FIG. 3.

Comparison of Polyurethane with Polyurethane-Urea (PUU)

Poly (tetrahydrofuran) (PTHF, Mw=2900), methylene diphenyl diisocyanate (MDI), ethylene diamine (EDA), dimethylacetamide (DMAc, anhydrous), and pentamethyl-diethylenetriamine were purchased from Sigma-Aldrich and directly used without purification.

The PTHF was dried under vacuum at 110° C. overnight to remove the residue water. The PUU was synthesized via two steps.

In the first step, 1 mmol of PTHF was firstly dissolved in 13.6 g DMAc at 80° C. in a 50 mL three-neck flask. 2 mmol MDI was then added and dissolved to form solution in the flask. Pentamethyldiethylenetriamine (0.1 w %, with respect to the reactant) in DMAc was added to the solution as a catalyst to form a mixture. The mixture was stirred at 80° C. for 4 h under dry nitrogen to get PTHF-2MDI intermediate solution with two isocyanate end groups. The solution was cooled down to about 20-25° C. before the addition of EDA.

In the second step, 1.05 mmol of EDA (ethylene diamine) in DMAc was added to the intermediate solution. (As EDA evaporated very fast, EDA was dispersed in DMAc to get 20 w % solution and the amounts of amino groups was 5% excessive than isocyanate groups.) The mixture was stirred at 80° C. for 4 h under dry nitrogen. After pouring the mixture into a Teflon mode and evaporating the solvent, a transparent and stretchable PUU film was obtained.

The PUU film was then dissolved in DMAc to form a polyurethane-urea solution. The PUU concentration was adjusted to about 6-8 wt % in the PUU solution for coating the anode. The PUU solution was then coated on the anode at ambient conditions.

Figure 4:
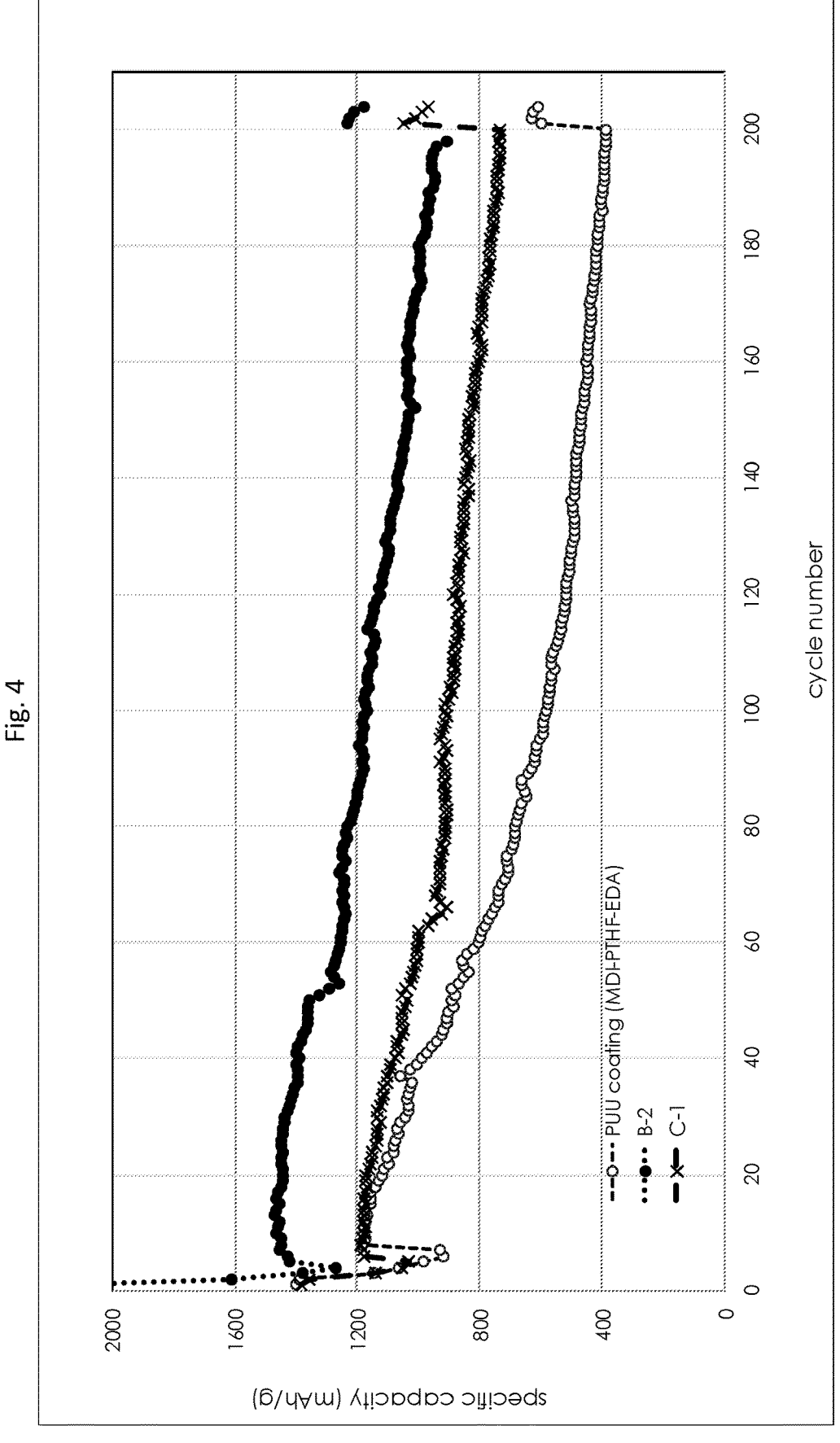
FIG. 4 is a graphical representation comparing the electrochemical performance of polyurethane-coated anodes from Samples B-2 and C-1 with a polyurethane-urea-coated anode, as described below.
Figure 5:
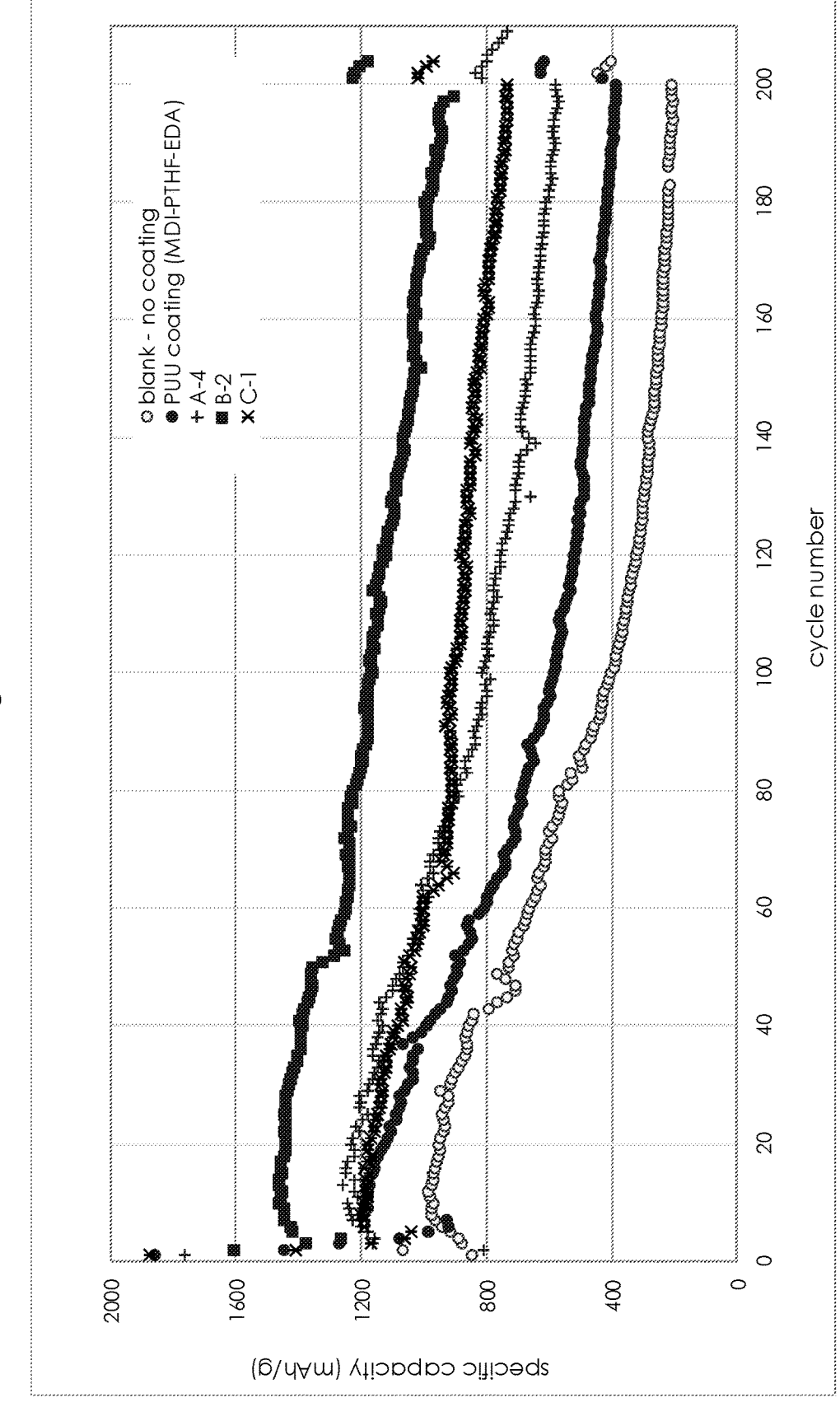
FIG. 5 is another graphical representation comparing the electrochemical performance of polyurethane-coated anodes from Samples A-4, B-2 and C-1 with a polyurethane-urea-coated anode, as described below.

The comparison of the electrochemical performance of polyurethane GPE-coated anodes with a polyurethane-urea-coated anode is shown in Table 2, and FIGS. 4 and 5. The results presented in FIGS. 4 and 5 suggest that anodes prepared with a polyurethane GPE coating have better capacity retention than anodes prepared with a polyure-thane-urea GPE coating.

TABLE 2

| Sample | Capacity retention @50 cycle (%) | Capacity retention @100 cycle (%) | Capacity retention @200 cycle (%) |
|---|---|---|---|
| Blank | 83 | 46 | 24 |
| PUU | 83 | 55 | 36 |
| A-4 | 92 | — | — |
| B-2 | 96 | 83 | 65 |
| C-1 | 91 | 80 | 64 |

Polyurethane Used as a Binder Composition

An anode was prepared using polyurethane as a binder composition rather than as a coating. 3.80 g Ashland™ 981 Carbomer (a cross-linked polymer of acrylic acid, commercially available from Ashland LLC, Wilmington, DE) was dissolved in 120.01 grams of NMP to form a binder solution. 50.00 g of the binder solution and 2.50 g of C-NERGY™ Super C65 were added and mixed into a 200-ml Thinky Mixer cup. 20.00 g of NMP and 20.00 g of SiOx were added into the cup to form a slurry. Sample C-1 film was dissolved in DMAc to form a 20 wt % polyurethane solution.

5.1 g of the polyurethane solution along with 5.00 g of NMP were added into the cup. The formed slurry was transferred to a 4-ounce glass jar with a cap and stored overnight. The mass ratio of anode active material to conductive carbon to Carbomer and the polyurethane was about 80:10:6:4. Three samples E, F and G were prepared based on the above procedure.

Figure 6:
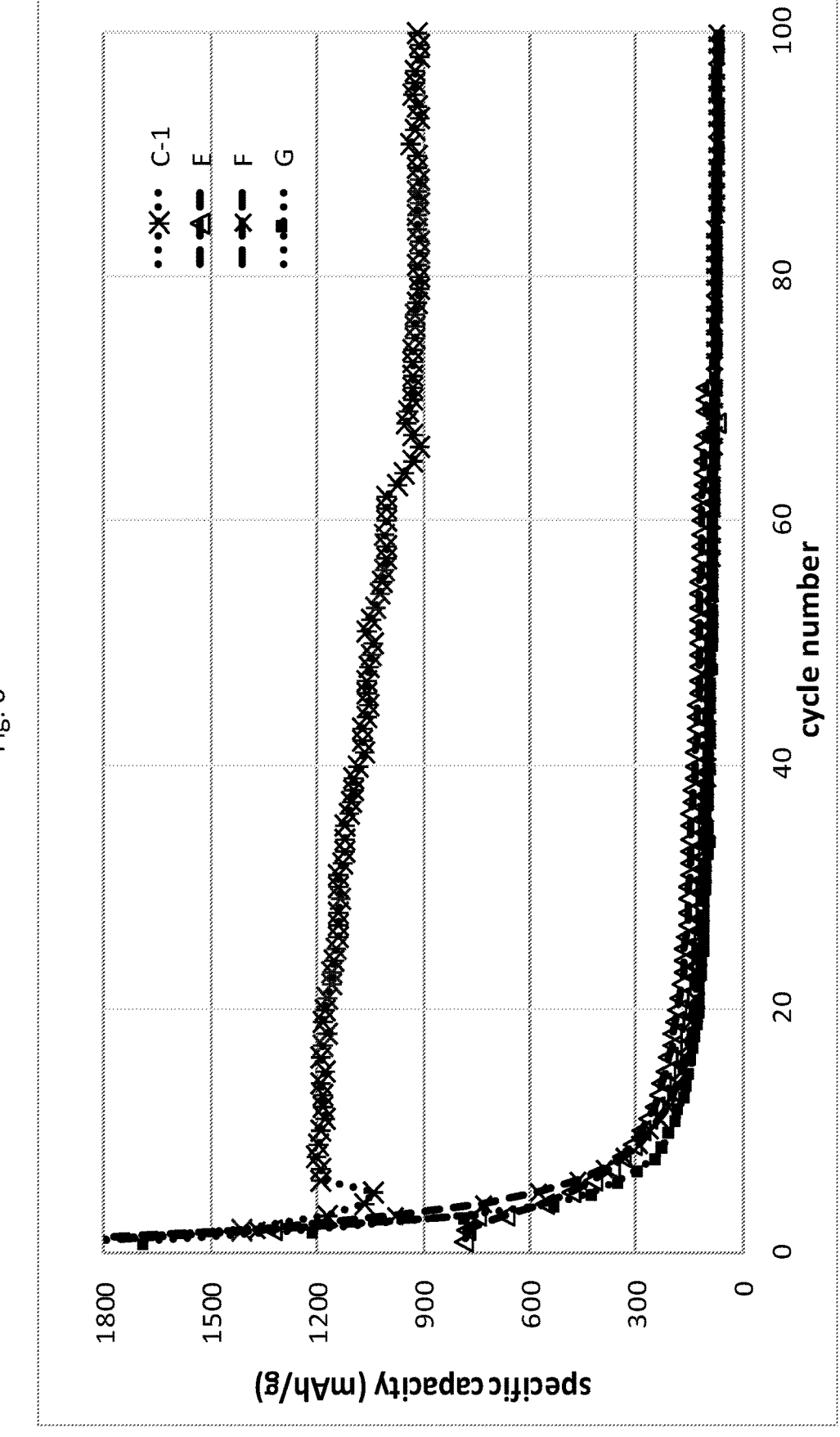
FIG. 6 is a graphical representation comparing the capacity retention of the polyurethane-coated anode from Sample C-1 with the anodes having polyurethane-containing binders E-G, as described below.

Table 3 presents comparison data of the analytical, impedance, and rate capabilities of the polyurethane-coated anode from Sample C-1 with the anodes of samples E, F, and G used as binders. FIG. 6 graphically presents the capacity retention data of the samples listed in Table 3 and obtained for the entire 100 cycles.

TABLE 3

| Sample | Electrode Density (g/cm$^3$) | Loading (mg/cm$^2$) | Impedance Fresh Cell (ohms) | ICE/2$^{nd}$ CE % |
|---|---|---|---|---|
| C-1 | 1.04 | 1.70 | 191.3 | 73.5/96.1 |
| E | 0.91 | 2.15 | 114.6 | 69.8/86.5 |
| F | 0.91 | 2.20 | 143.7 | 70.5/82.8 |
| G | 0.95 | 2.26 | 158.2 | 67.7/75.8 |

FIG. 6 demonstrates that the cyclic performance of the polyurethane-coated electrode without polyurethane in the binder is greatly improved as compared to the cyclic performance of the electrode containing a polyurethane binder and no polyurethane coating. The capacity for the polyure-thane binder samples declined very quickly as compared to the polyurethane coating sample.

Thus, it should be apparent that there has been provided in accordance with the present invention an improved coating composition for use on an electrode, that fully satisfies the objectives and advantages set forth above. Although the invention has been described in conjunction with specific embodiments thereof, it is evident that many alternatives, modifications, and variations will be apparent to those skilled in the art. Accordingly, it is intended to embrace all such alternatives, modifications, and variations that fall within the spirit and broad scope of the appended claims.

What is claimed is:

1. A method of making a coated electrode for use in preparation of a lithium ion battery comprising:
   (i) combining an electrode active material, a binder composition, and a conductive agent to form a slurry;
   (ii) applying the slurry to a current collector to form a coated current collector comprising a slurry layer on the current collector;
   (iii) drying the slurry layer on the coated current collector to form a film on the current collector, wherein the electrode comprises the film and the current collector;
   (iv) applying a polymer coating composition in a solvent to the electrode to form a coated electrode having an outer surface substantially covered by the polymer coating composition, wherein the polymer coating composition is solution-coated on the electrode; and
   (v) evaporating the solvent from the polymer coating composition to form a polyurethane gel polymer electrolyte coating on the electrode,
      wherein the polyurethane gel polymer electrolyte comprises a polyurethane formed by a reaction comprising (i) an isocyanate and (ii) a polyol, wherein a molar ratio of the polyol to the isocyanate is in a range of from about 1.0:1.2 to about 1.0:2.0;
      wherein the isocyanate is an aromatic diisocyanate and the polyol is a polyether polyol;
   wherein the solvent is selected from the group consisting of N, N-dimethylacetamide (DMAc), tetrahydrofuran (THF), dimethyl sulfoxide (DMSO), tetramethylsilane (TMS), and dimethylformamide (DMF).

2. The method of claim 1, wherein a mass ratio of the electrode active material to the conductive agent to the binder composition is about 8:1:1.

3. The method of claim 1, wherein the polymer coating composition has a mass loading in a range of from about 0.1 $mg/cm^2$ to about 0.9 $mg/cm^2$.

4. The method of claim 1, wherein the polyurethane is present in the polymer coating composition in a range of from about 1% to about 25% by weight.

5. The method of claim 1, wherein the aromatic isocyanate is 4,4'-methylenebis(phenyl isocyanate).

6. The method of claim 1, wherein the polyether polyol is poly(tetrahydrofuran).

7. The method of claim 1, wherein the molar ratio of the polyol to the isocyanate is about 1.0:1.5.

8. The method of claim 1, wherein the polyol has a number average molecular weight in a range of from about 1,000 to about 3,500 Daltons.

9. The method of claim 8, wherein the polyol has a number average molecular weight of about 1,570 Daltons.

10. The method of claim 1, wherein the reaction is substantially free of ethylene diamine.

11. The method of claim 1, wherein the electrode active material is an anode active material.

12. The method of claim 11, wherein the anode active material is selected from the group consisting of (A) a carbonaceous material, (B) a silicon-based alloy, (C) a complex compound comprising a carbonaceous material and a metal selected from the group consisting of Al, Ag, Bi, In, Ge, Mg, Pb, Si, Sn, Ti, and combinations thereof, (D) a lithium complex metal oxide, (E) a lithium-containing nitride, and (F) combinations of components comprising items (A)-(E).

13. The method of claim 12, wherein the anode active material comprises graphite and silicon oxide, wherein a weight ratio of the graphite to the silicon oxide is in a range of from about 99:1 to about 1:99.

14. The method of claim 1, wherein the binder composition is substantially free of polyurethane.

15. The method of claim 1, wherein the conductive agent is selected from the group consisting of conductive carbon, carbon nanotubes, carbon black, carbon fiber, graphite, graphene, and combinations thereof.

16. The method of claim 1, wherein the current collector is selected from the group consisting of aluminum, carbon, copper, stainless steel, nickel, zinc, silver, and combinations thereof.

* * * * *